(12) United States Patent
Miyauchi et al.

(10) Patent No.: US 8,444,904 B2
(45) Date of Patent: May 21, 2013

(54) RESIN GEAR

(75) Inventors: Naoto Miyauchi, Obu (JP); Masashi Ozeki, Obu (JP); Yoshiyasu Yasui, Obu (JP); Akihiro Kamiya, Takahama (JP); Hiroki Shimada, Anjo (JP)

(73) Assignees: Aisan Kogyo Kabushiki Kaisha, Obu (JP); Denso Corporation, Kariya (JP)

( * ) Notice: Subject to any disclaimer, the term of this patent is extended or adjusted under 35 U.S.C. 154(b) by 334 days.

(21) Appl. No.: 12/923,824

(22) Filed: Oct. 8, 2010

(65) Prior Publication Data

US 2011/0024946 A1 Feb. 3, 2011

Related U.S. Application Data

(62) Division of application No. 11/647,242, filed on Dec. 29, 2006, now abandoned.

(30) Foreign Application Priority Data

Feb. 13, 2006 (JP) .................................. 2006-034964

(51) Int. Cl.
*F16H 55/06* (2006.01)
(52) U.S. Cl.
USPC ...................... 264/328.1; 74/DIG. 10; 74/434
(58) Field of Classification Search
USPC .................. 74/434, 437, 438, 448, 460–466, 74/DIG. 10, DIG. 11; 251/248, 249
See application file for complete search history.

(56) References Cited

U.S. PATENT DOCUMENTS

| 3,199,364 | A | | 8/1965 | Dew |
| 5,601,491 | A | | 2/1997 | Chan et al. |
| 6,070,484 | A | * | 6/2000 | Sakamaki ........................ 74/434 |
| 6,576,177 | B2 | * | 6/2003 | Fukuchi ......................... 264/219 |

(Continued)

FOREIGN PATENT DOCUMENTS

| EP | 1 484 152 A1 | 12/2004 |
| JP | U-04-080956 | 7/1992 |

(Continued)

OTHER PUBLICATIONS

Jan. 11, 2011 Office Action issued in Japanese Patent Application No. 2006-034964 (with translation).

*Primary Examiner* — William C Joyce
*Assistant Examiner* — Terence Boes
(74) *Attorney, Agent, or Firm* — Oliff & Berridge, PLC

(57) ABSTRACT

A resin gear comprises a rim in an outer peripheral part of a plate, teeth provided on an outer periphery of the rim, a boss provided in a central part of the plate, and a circular rib between the boss and the rim. The resin gear is manufacturable by injection molding that a molten material is injected into a cavity through a plurality of gates arranged at almost equally spaced intervals circumferentially on a forming portion for the circular rib in a direction perpendicular to a side of the plate. The resin gear includes a plurality of inner thin-wall portions on the plate between the circular rib and the boss and a plurality of outer thin-wall portions on the plate between the circular rib and the rim, each of the inner thin-wall portions and the outer thin-wall portions being symmetrically shaped with respect to the radial line passing through each gate corresponding point.

15 Claims, 10 Drawing Sheets

U.S. PATENT DOCUMENTS

| | | | |
|---|---|---|---|
| 6,941,832 B2 * | 9/2005 | Noguchi et al. | 74/461 |
| 7,004,046 B2 * | 2/2006 | Noguchi et al. | 74/443 |
| 7,406,891 B2 | 8/2008 | Miyasaka | |
| 2002/0029648 A1 | 3/2002 | Noguchi et al. | |
| 2004/0043100 A1 * | 3/2004 | Ojima | 425/542 |
| 2004/0226396 A1 * | 11/2004 | Noguchi | 74/431 |
| 2006/0053917 A1 | 3/2006 | Asari et al. | |
| 2006/0081082 A1 | 4/2006 | Noguchi et al. | |

FOREIGN PATENT DOCUMENTS

| | | |
|---|---|---|
| JP | A-8-25501 | 1/1996 |
| JP | B2-3364873 | 11/2002 |
| JP | B2-3387218 | 1/2003 |
| JP | A-2004-84846 | 3/2004 |

* cited by examiner

RESIN GEAR

CROSS-REFERENCE TO RELATED APPLICATIONS

This is a Division of application Ser. No. 11/647,242 filed Dec. 29, 2006, which claims priority of Japanese Patent Application No. 2006-034964, filed Feb. 13, 2006. The disclosure of the prior applications is hereby incorporated by reference herein in its entirety.

BACKGROUND OF THE INVENTION

1. Field of the Invention

The present invention relates to a resin gear manufactured by injection molding in which a molten material is injected into a cavity of a mold through a plurality of gates.

2. Description of Related Art

Heretofore, this type of technique may include the techniques disclosed in Japanese Patents No. 3364873 and 3387218 and Japanese unexamined Utility Model application publication No. 4(1992)-80956. Of them, for example, Japanese Patent No. 3364873 discloses one example of electronically controlled throttle valve systems. This system comprises a throttle valve, an actuator for actuating the throttle valve, and a throttle body which houses and supports the throttle valve and the actuator. The throttle valve is fixed to a throttle shaft rotatably supported in the throttle body. An output shaft of the actuator is drivingly coupled to the throttle shaft via a gear transmission mechanism including a plurality of gears. This system is arranged to rotate the output shaft of the actuator, rotating the throttle shaft through the gear transmission mechanism, thereby opening/closing the throttle valve. Herein, in order to accurately open/close the throttle valve in association with the rotation of the output shaft of the actuator, each gear of the gear transmission mechanism has to be machined with high accuracy. In recent years, a resin gear is often used because of a demand for weight saving. A resin gear made of resin by injection molding particularly has an issue of molding accuracy such as roundness.

According to Japanese Patent No. 3387218, when a resin molded component such as a gear is to be manufactured by injection molding, a molten material is injected into a cavity of a mold through a plurality of gates arranged at almost equally spaced intervals circumferentially on a piece to be molded. The resin material has a thermal shrinkage rate different between a direction of flow and a direction perpendicular to the flow. In the above case, accordingly, it would be considered to be extremely difficult to achieve dimensional accuracy of the molded piece, in particular the accuracy of a peripheral part thereof.

According to Japanese Patent No. 3387218, further, the roundness of the molded piece also largely depends on the resin material. Specifically, to enhance rigidity and elasticity of gears, fibrous additives such as glass and carbon fiber are often mixed to resin. The molten material injected into the cavity usually spreads from each gate, and thus merging lines (weld lines) are formed extending in a radial direction between the gates, as many as the number of gates. Accordingly, the additives are oriented along the weld lines in the weld line region and oriented in a direction substantially perpendicular to the weld lines in other areas. This orientation induces a difference in shrinkage of the resin in each angular position, which makes it difficult to provide high roundness of the peripheral part. This problem of roundness is apparent in a rim in the peripheral part of the gear and more or less found in a boss in the central part of the gear. It can be considered that the reason why the difference in distribution of the shrinkage rate causes difficulty in providing high roundness is how the molten material flows in the cavity. The molten resin is normally supposed to flow radially outwardly in every directions from the center; however, this flow pattern is substantially impossible for the molded piece such as a gear formed with a boss. Thus, the plurality of gates is usually arranged on a disk face of the gear to be molded. If those gates are positioned closely around the boss, the time needed for injection of the molten resin into the cavity will be longer and it is also hard to control the temperature during the injection. Further, this configuration has a narrow space between the adjacent gates, resulting in a difficulty in machining a mold itself. It is accordingly conceivable to arrange many gates circumferentially almost midway between the rim and the boss of the gear. This configuration could also has the following problems if many gates are closely spaced that: (1) the temperature on the side of the piece being molded where the gates are arranged for injection of the material extremely rises (the temperature of the molten material is about 320° C.), which causes a large difference in temperature from the opposite side, leading to a difference in shrinkage during cooling; (2) many runners are needed, deteriorating utilization efficiency of the material; and (3) the number of machining steps for manufacture of the mold is increased.

Japanese Patent No. 3387218 therefore discloses a resin gear having excellent roundness, which can be manufactured in a manner that allows the molten material to uniformly flow radially inwardly and outwardly from positions circumferentially arranged between the rim and the boss without requiring an increase in number of gates. To be concrete, as shown in FIG. 16, this gear is formed with a boss 62 at the center of a disk 61 and a rim 63 in the outer peripheral part. Between the boss 62 and the rim 63, a circular rib 64 is formed concentrically with them. Further, thick-wall portions 65 and 66 are concentrically formed between the rim 63 and the circular rib 64 and between the circular rib 64 and the boss 62 respectively. The intermediate portions between the inner thick-wall portion 65 and the circular rib 64 and between the outer thick-wall portion 66 and the circular rib 64 form thin recessed portions 67 and 68 respectively. The molten resin is injected into the cavity in a direction perpendicular to the side of the disc 61 through a plurality of gates (gate marks 69) are arranged in circumferentially angular positions at almost equally spaced intervals on the circular rib 64. Radial ribs 70 are formed almost midway between the positions of injection through the gates (the gate marks 69) and extending radially between the thick-wall portions 65 and 66 via the circular rib 64.

In the aforementioned conventional gear, the radial ribs 70 formed between the gates (the gate marks 69) are of large thickness and large area. This would cause the pressure of the molten material to disperse, resulting in a decreased molding-injection force, so that the radial flow of the molten material is induced through the radial ribs 70 with the result that longer weld lines are formed. The length of each weld line exerts a large influence on the shrinkage property (anisotropy) of the molten resin. Thus, there is a possibility that the strength and the dimensional accuracy of the gear are deteriorated. The recessed portions 67 and 68 formed inside and outside of the circular rib 64 are uniform in width and small in thickness. During molding, therefore, the flow of the molten material is likely to become slow as coming away from the gates and be injected nonuniformly, which causes a deterioration of dimensional accuracy of the gear. Such deterioration of gear strength and dimensional accuracy would affect on opening/ closing accuracy and smooth operations of the throttle valve in the electronically controlled throttle valve system.

BRIEF SUMMARY OF THE INVENTION

The present invention has been made in view of the above circumstances and has an object to provide a resin gear with improved strength and dimensional accuracy.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a resin gear comprising: a circular plate; a rim provided in an outer peripheral part of the plate; teeth formed on an outer periphery of the rim; a boss provided in a central part of the plate; and a circular rib provided on the plate between the boss and the rim and concentrically with the plate; the resin gear being manufacturable by injection molding in which a molten material is injected into a cavity through a plurality of gates arranged at almost equally spaced intervals circumferentially on a forming portion for the circular rib in a manner that the molten resin is injected in a direction perpendicular to a side of the plate, wherein the resin gear is formed with inner thin-wall portions on the plate between the circular rib and the boss, each of the inner thin-wall portions being symmetrical with respect to a radial line passing through each of a plurality of gate corresponding points which correspond to the gates respectively.

According to another aspect, the invention provides a resin gear comprising: a circular plate; a rim provided as an outer peripheral part of the plate; teeth formed on an outer periphery of the rim; a boss provided in a central part of the plate; and a circular rib provided on the plate between the boss and the rim and concentrically with the plate; the resin gear being manufacturable by injection molding that a molten material is injected into a cavity through a plurality of gates arranged at almost equally spaced intervals circumferentially on a forming portion for the circular rib in a manner that the molten resin is injected in a direction perpendicular to a side of the plate, wherein the resin gear is formed with an outer thin-wall portion on the plate between the circular rib and the rim, the outer thin-wall portion being symmetrical with respect to a radial line passing through each gate corresponding point corresponding to each gate.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

First Embodiment

A detailed description of a first preferred embodiment of a resin gear of the present invention will now be given referring to the accompanying drawings.

Figure 1:
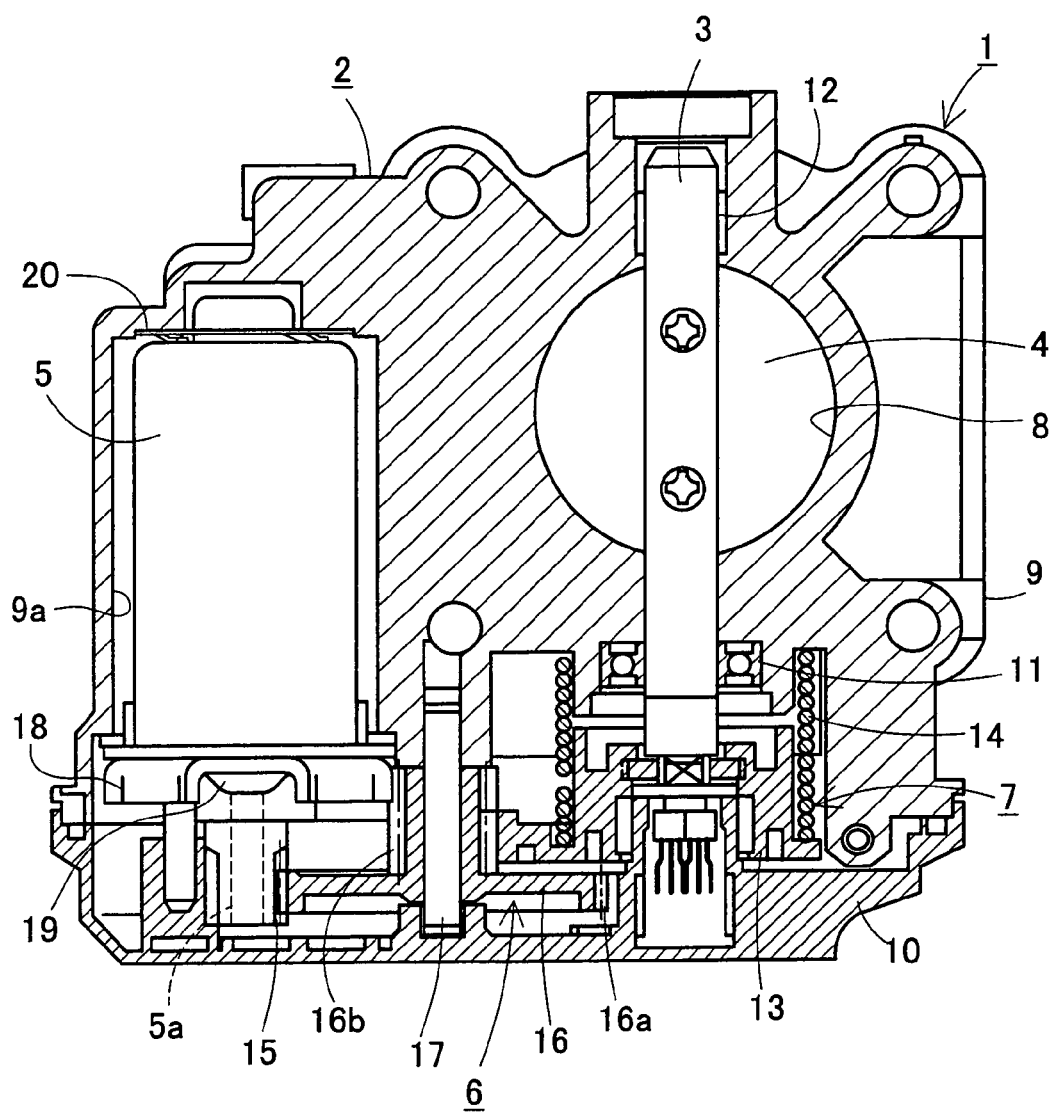
FIG. 1 is a sectional plan view of an electronically controlled throttle valve system.

FIG. 1 is a plan view of an electronically controlled throttle valve system 1. This throttle valve system 1 includes, as main components, a throttle body 2, a throttle shaft 3, a throttle valve 4, a DC motor 5, a speed reduction mechanism 6, and an opener mechanism 7.

In the present embodiment, the throttle body 2 includes a valve housing 9 made of synthetic resin and formed with a bore 8 which will be communicated with an intake passage (not shown) of an engine and an end frame 10 made of synthetic resin and placed closing an open end of the valve housing 9. The throttle shaft 3 and the throttle valve 4 are housed and supported in the valve housing 9. In other words, the throttle shaft 3 is placed across the bore 8 in a manner that both ends of the shaft 3 are rotatably supported in the valve housing 9 through bearings 11 and 12. The throttle valve 4 is secured to the throttle shaft 3 with screws and placed in the bore 8.

Figure 2:
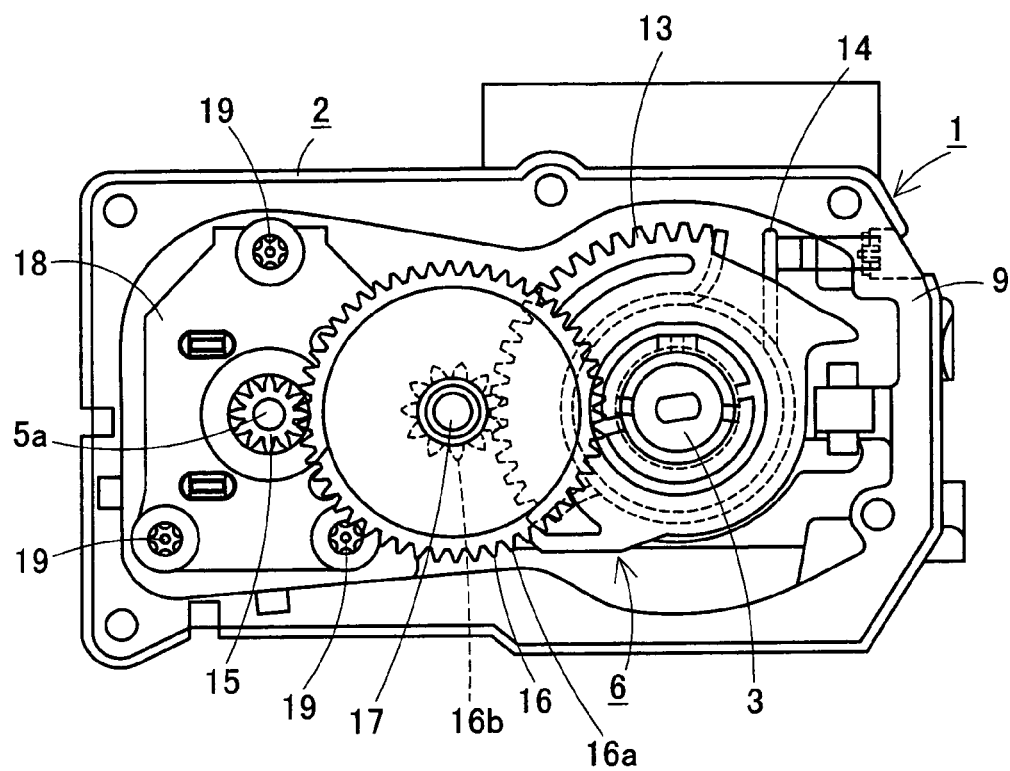
FIG. 2 is a front view of a valve housing from which an end frame has been detached.

FIG. 2 is a front view of the valve housing 9 with the end frame 10 detached from the throttle body 2. A throttle gear 13 is fixed to one end of the throttle shaft 3. A return spring 14 is provided between the throttle gear 13 and the valve housing 9 to bias the throttle valve 4 toward a closed position. The return spring 14 is an element constituting the opener mechanism 7.

In the present embodiment, the DC motor 5 corresponds to the actuator of the present invention, which is housed and supported in the valve housing 9. The DC motor 5 is coupled to the throttle shaft 3 through the speed reduction mechanism 6 for actuating the throttle valve 4 toward an open position. Specifically, a motor gear 15 is fixed on an output shaft 5b of the DC motor 5. The motor gear 15 is coupled to the throttle gear 13 through an intermediate gear 16. This intermediate gear 16 is a double gear integrally configured of a large-diameter gear 16a and a small-diameter gear 16b, which is rotatably supported in the valve housing 9 with a pin shaft 17. The large-diameter gear 16a is engaged with the motor gear 15, while the small-diameter gear 16b is engaged with the throttle gear 13. The speed reduction mechanism 6 in the present embodiment corresponds to a gear transmission mechanism of the present invention.

Upon actuation of the DC motor 5 by energization, from a full closed state of the throttle valve 4 shown in FIG. 1, the output shaft 5*a* is rotated in a normal direction, thereby rotating the motor gear 15. This rotation is reduced in speed through the intermediate gear 16 and then transmitted to the throttle gear 13. Accordingly, the throttle shaft 3 and the throttle valve 4 are rotated against the biasing force of the return spring 14 to open the bore 8. The throttle valve 4 is thus opened. Further, in order to hold the throttle valve 4 at a certain opening degree, the DC motor 5 is energized to generate torque, which is transmitted as a holding force to the throttle shaft 3 and the throttle valve 4 through the motor gear 15, the intermediate gear 16, and the throttle gear 13 in order. When this holding force is balanced with respect to the biasing force of the return spring 14, the throttle valve 4 will be kept at the certain opening degree.

As shown in FIGS. 1 and 2, the DC motor 5 is fixedly housed in a cavity 9*a* formed in the valve housing 9. Specifically, an output-side end (base end) of the DC motor 5 is fixed to the valve housing 9 with a bracket 18 and screws 19. A non-output-side end (free end) of the DC motor 5 is supported in the valve housing 9 with an elastic body 20. With such mounting structure, both ends of the DC motor 5 are supported in the throttle body 2 (the valve housing 9), thus preventing wobbling of the DC motor 5 in the valve housing 9.

In the present embodiment, adopted as each gear 13, 15, and 16 constituting the speed reduction mechanism 6 is a resin gear made of a resin material by injection molding for weight saving. Each gear 13, 15, and 16 is formed to include glass or carbon fibers in addition to resin. In particular, the intermediate gear 16 is a circular resin gear and therefore the molding accuracy such as roundness is important. FIG. 2 shows only an outer shape of the intermediate gear 16 in front view. The details of the characteristic shape thereof are explained below.

Figure 3:
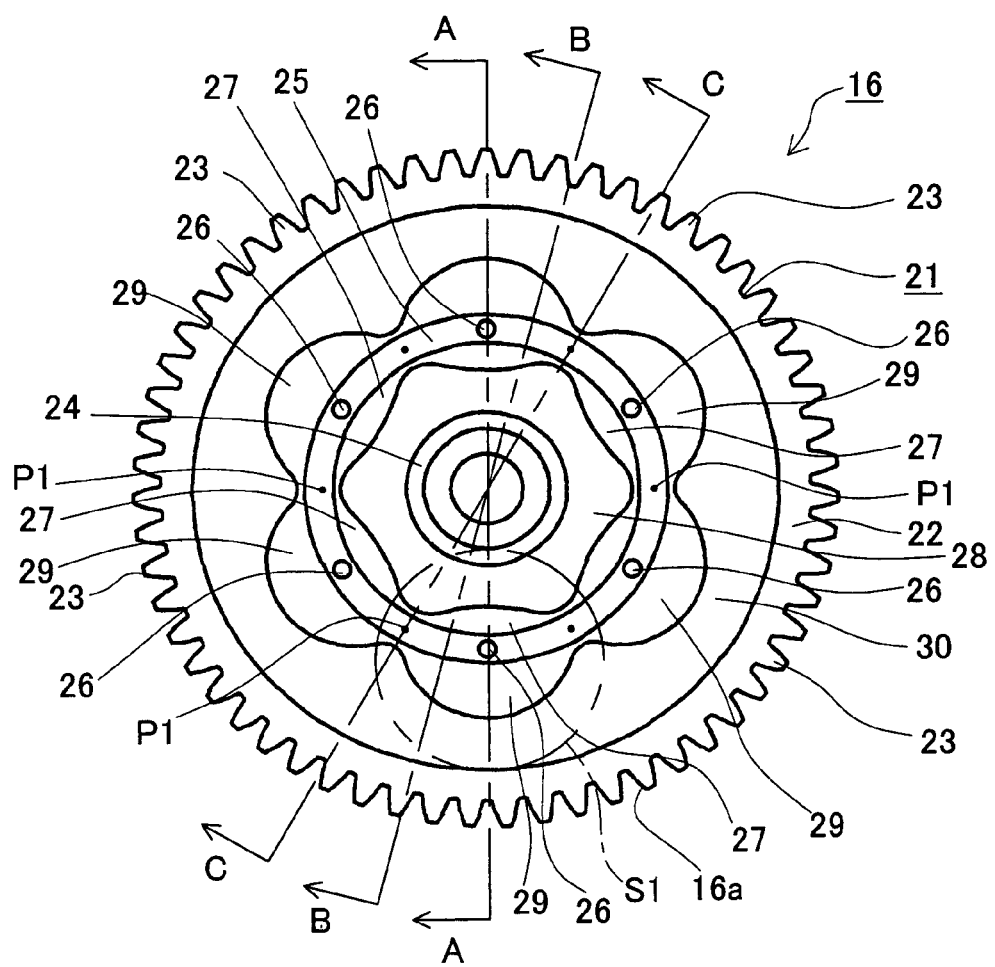
FIG. 3 is a front view of an intermediate gear.
Figure 4:
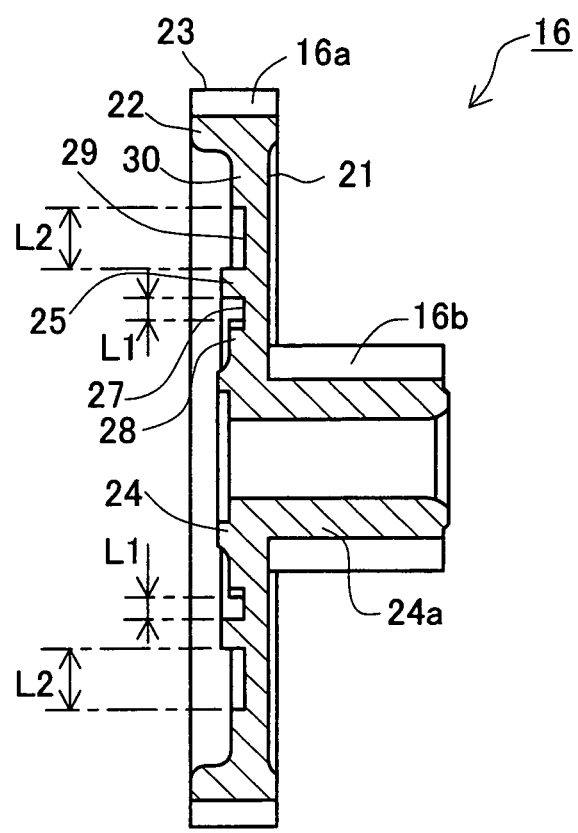
FIG. 4 is a sectional view of the intermediate gear taken along a line A-A in FIG. 3.
Figure 5:
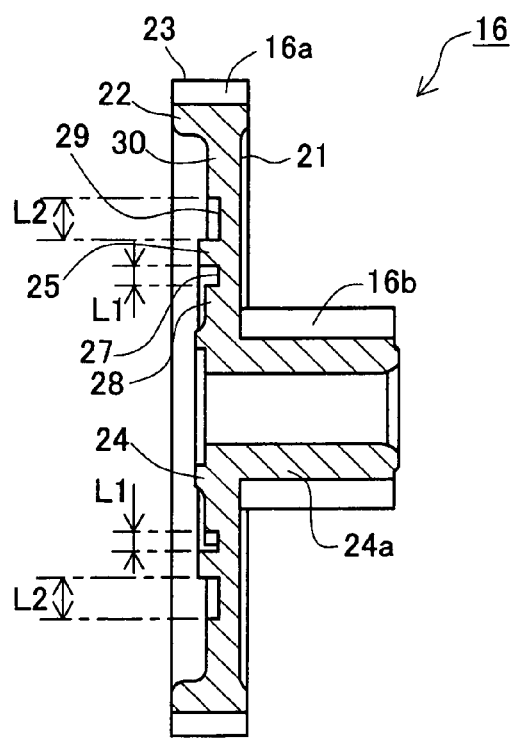
FIG. 5 is a sectional view of the intermediate gear taken along a line B-B in FIG. 3.
Figure 6:
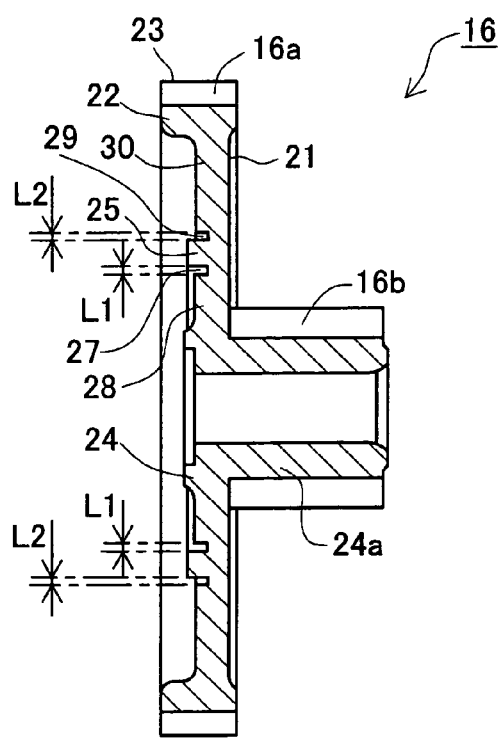
FIG. 6 is a sectional view of the intermediate gear taken along a line C-C in FIG. 3.
Figure 7:
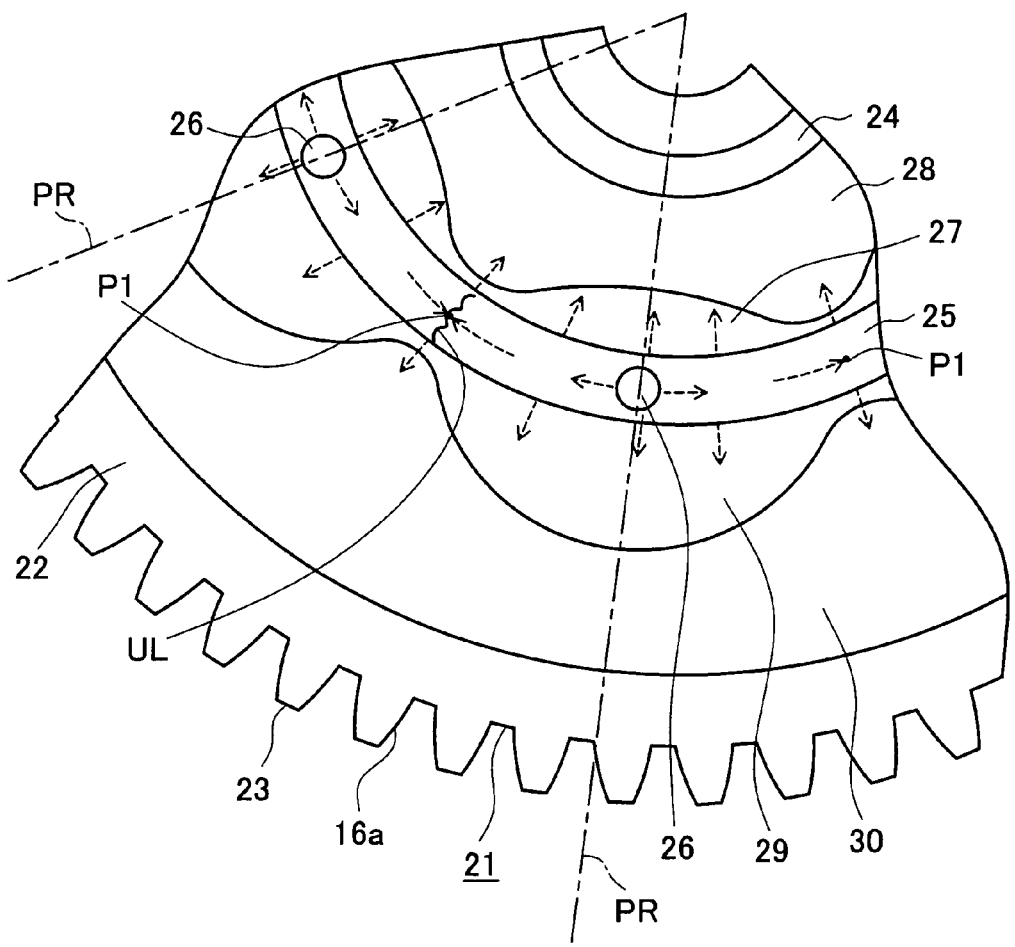
FIG. 7 is a front enlarged view of part of FIG. 3.

FIG. 3 is a front view of the intermediate gear 16. FIG. 4 is a sectional view of the same taken along a line A-A in FIG. 3; FIG. 5 is a sectional view, taken along a line B-B in FIG. 3; FIG. 6 is a sectional view, taken along a line C-C in FIG. 3; and FIG. 7 is an enlarged view of part of FIG. 3.

As shown in FIGS. 3 to 6, the intermediate gear 16 includes a circular plate 21, a rim 22 provided in the outer peripheral part of the plate 21, a plurality of teeth 23 formed on the outer periphery of the rim 22, a cylindrical boss 24 provided in the central part of the plate 21, and a circular rib 25 arranged on and concentrically with the plate 21 between the boss 24 and the rim 22. This intermediate gear 16 is manufactured by injection molding in which a molten material is injected into a cavity of a mold (not shown) in a direction perpendicular to one side of the plate 21 to be formed through a plurality of gates circumferentially arranged at almost equally spaced intervals on the circular rib 25 to be formed.

The intermediate gear 16 includes a large-diameter gear 16*a* formed with the above plurality of teeth 23. A boss provided on the back side of the plate 21 is formed axially protruding to form a cylindrical protruding portion 24*a* on the outer periphery of which a small-diameter gear 16*b* is formed (see FIGS. 1 and 2).

Herein, the intermediate gear 16 is provided with inner thin-wall portions 27 in the plate 21 between the circular rib 25 and the boss 24 so that each inner thin-wall portion 27 is positioned in alignment with the gate corresponding point (shown as the gate mark 26) corresponding to the gate of the mold. In the present embodiment, six gate marks 26 exist and, as many, six inner thin-wall portions 27 are provided. As shown in FIG. 7, each inner thin-wall portion 27 is of a symmetrical shape with respect to a radial line PR passing through each gate mark 26. The length L1 of each inner thin-wall portion 27 in a radius direction (see FIGS. 4 to 6) is determined to be shorter in a section closer to the midpoint P1 between adjacent two of the gate marks 26. Further, all the inner thin-wall portions 27 radially aligned with the gate marks 26 respectively are equal in shape, wholly providing an inner thick-wall portion 28 having a petaloid outer shape on the plate 21 between the circular rib 25 and the boss 24.

In addition, the intermediate gear 16 is provided, on the plate 21 between the circular rib 25 and the rim 22, with an outer thin-wall portion 29 in alignment with each gate mark 26. As shown in FIG. 7, each outer thin-wall portion 29 is of a symmetrical shape with respect to the radial line PR passing through each gate mark 26. The length L2 of each thin-wall portion 29 in the radius direction (see FIGS. 4 to 6) is determined to be shorter in a section closer to the midpoint P between adjacent two of the gate marks 26. Further, all the outer thin-wall portions 29 radially aligned with the gate marks 26 respectively are equal in shape to wholly have a petaloid outer shape on the plate 21 between the circular rib 25 and the rim 22. Accordingly, an outer thick-wall portion 30 forming a petaloid pattern is formed between each outer thin-wall portion 29 and the rim 22. In the present embodiment, those circular rib 25, inner thin-wall portions 27, inner thick-wall portion 28, outer thin-wall portions 29, and outer thick-wall portion 30 are provided on only a front side of the plate 21.

According to the intermediate gear 16 in the present embodiment described above, during molding thereof, the molten resin is injected into the cavity of the mold through the plurality of gates arranged at almost equally spaced intervals circumferentially on a forming portion for the circular rib 25 in the mold. The injected molten resin will flow in the radius direction from each gate corresponding point (each gate mark 26) in the cavity as shown with dotted lines in FIG. 7. However, most of the injected molten resin will flow circumferentially through the forming portion for the circular rib 25 in the mold and, on the way, part thereof gradually flows in the radius direction. The molten resin flowing through the forming portion for the circular rib 25 in the mold will then merge with the molten resin having flowed therein from the adjacent gate corresponding point (the gate mark 26), and the merged molten resin will flow in the radius direction. In this way, all the molten resin will flow radially outwardly and inwardly from the circular rib 25. In the above merging region of the molten resin, the merging line (the weld line) UL is generated, of which the length is likely to exert an influence on the shrinkage behavior (anisotropy). Thus, the weld line UL should be as short as possible. To provide a short weld line, it is necessary to restrain a decrease in pressure of the molten resin at the merging region.

For this end, the intermediate gear 16 in the present embodiment is designed in a manner that the circular rib 25 is thicker than other portions and each inner thin-wall portion 27 is symmetric with respect to the radial line PR passing through the gate corresponding points (the gate marks 26) on the plate 21 between the circular rib 25 and the boss 24. Accordingly, the flow of the molten resin flowing from each gate corresponding point (each gate mark 26) toward a forming portion for the boss 24 is restrained in forming portions for the inner thin-wall portions 27. This configuration prompts the molten resin to flow by just that much through a forming portion for the circular rib 25, thereby increasing the pressure of the molten resin in the forming portion for the circular rib 25 to reduce the formation of the weld line UL extending toward the central part. This makes it possible to enhance the strength and the dimensional accuracy of the central part inside the circular rib 25 of the intermediate gear 16 molded of resin.

The intermediate gear 16 in the present embodiment is designed such that the length L1 of each inner thin-wall portion 27 in the radius direction of the intermediate gear 16 is determined to be shorter in a closer section to the midpoint P1 between adjacent two of the gate corresponding points (gate marks 26). The molten resin flowing from the circular rib 25 toward the boss 24 is therefore restrained the most around each gate corresponding point (each gate mark 26) and is gradually allowed with less restraint as advancing from each gate corresponding point (each gate mark 26) to the midpoint P1 between the adjacent gate corresponding points (gate marks 26). Thus, the flow of the molten resin from the circular rib 25 toward the boss 24 in the cavity can be uniformized within each inner thin-wall portion 27. In this regard, the strength and the dimensional accuracy of the central part of the intermediate gear 16 can be more increased.

In the intermediate gear 16 in the present embodiment, further, all the inner thin parts 27 aligned with the gate corresponding points (the gate marks 26) are equal in shape. Thus, the inner thick-wall portion 28 takes the outer shape of a petal on the plate 21 between the circular rib 25 and the boss 24. Accordingly, during molding, the molten resin is allowed to uniformly flow in any inner thin-wall portion 27 throughout the circular rib 25. This makes it possible to allow the molten resin attempting to flow from the circular rib 25 toward the boss 24 to uniformly flow throughout the circular rib 25. This results in further improved strength and dimensional accuracy of the central part inside the circular rib 25 of the intermediate gear 16. In particular, the strength and the dimensional accuracy of the small-diameter gear 16b formed around the boss 24 can be enhanced.

In the intermediate gear 16 in the present embodiment, additionally, the circular rib 25 is thicker than other portions and the plate 21 is formed, between the circular rib 25 and the rim 22, with the outer thin-wall portions 29 each having a symmetrical shape with respect to the radial line PR passing through each gate corresponding point (each gate mark 26). Accordingly, during molding, the flow of the molten resin flowing from each gate corresponding point (each gate mark 26) toward the forming portion for the rim 22 in the cavity is restrained in each the forming portion for the outer thin-wall portion 29. This configuration prompts the molten resin to flow by just that much through the forming portion for the circular rib 25, thereby increasing the pressure of the molten resin in the forming portion for the circular rib 25 to reduce the formation of the weld line UL extending toward the outer peripheral part. This makes it possible to enhance the strength and the dimensional accuracy of the outer peripheral part outside the circular rib 25 of the intermediate gear 16 molded of resin.

The intermediate gear 16 in the present embodiment is designed such that the length L2 of each outer thin-wall portion 29 in the radius direction of the intermediate gear 16 is determined to be shorter in a closer section to the midpoint P1 between adjacent two of the gate corresponding points (gate marks 26). The molten resin flowing from the forming portion for the circular rib 25 toward the forming portion for the rim 22 in the cavity is therefore restrained the most around each gate corresponding point (each gate mark 26) and is gradually allowed with less restraint as advancing from each gate corresponding point (each gate mark 26) to the midpoint P1 between the adjacent gate corresponding points (gate marks 26). Thus, the flow of the molten resin from the forming portion for the circular rib 25 toward the forming portion for the rim 22 can be uniformized within each the forming portion for the outer thin-wall portion 29.

In the intermediate gear 16 in the present embodiment, furthermore, all the outer thin-wall portions 29 aligned with respective gate corresponding points (gate marks 26) are equal in shape. Thus, the plurality of outer thin-wall portions 29 wholly takes the outer shape of a petal on the plate 21 between the circular rib 25 and the rim 22. Accordingly, during molding, the molten resin is allowed to uniformly flow in any forming portion for the outer thin-wall portion 29 throughout the forming portion for the circular rib 25. This results in further improved strength and dimensional accuracy of the outer peripheral part outside the circular rib 25 of the intermediate gear 16. In particular, the strength and the dimensional accuracy of the large-diameter gear 16a formed around the rim 22 can be enhanced.

In the intermediate gear 16, specifically, during resin molding, the strength and the dimensional accuracy of both the central part inside the circular rib 25 and the outer peripheral part outside the same can be improved, achieving enhanced strength and dimensional accuracy of the whole intermediate gear 16. It is therefore possible to enhance accuracy and smoothness of operations of the speed reduction mechanism 6 of the electronically controlled throttle valve system 1. Accordingly, the opening/closing accuracy and the smoothness of operations of the throttle valve 4 can also be enhanced.

Second Embodiment

A second embodiment of the resin gear according to the present invention will be described below with reference to the accompanied drawings.

It is to be noted that similar or identical parts or components to those in the first embodiment are given the same reference numerals and their details are not repeated herein. The following description is made with a focus on different structures from those in the first embodiment.

Figure 8:
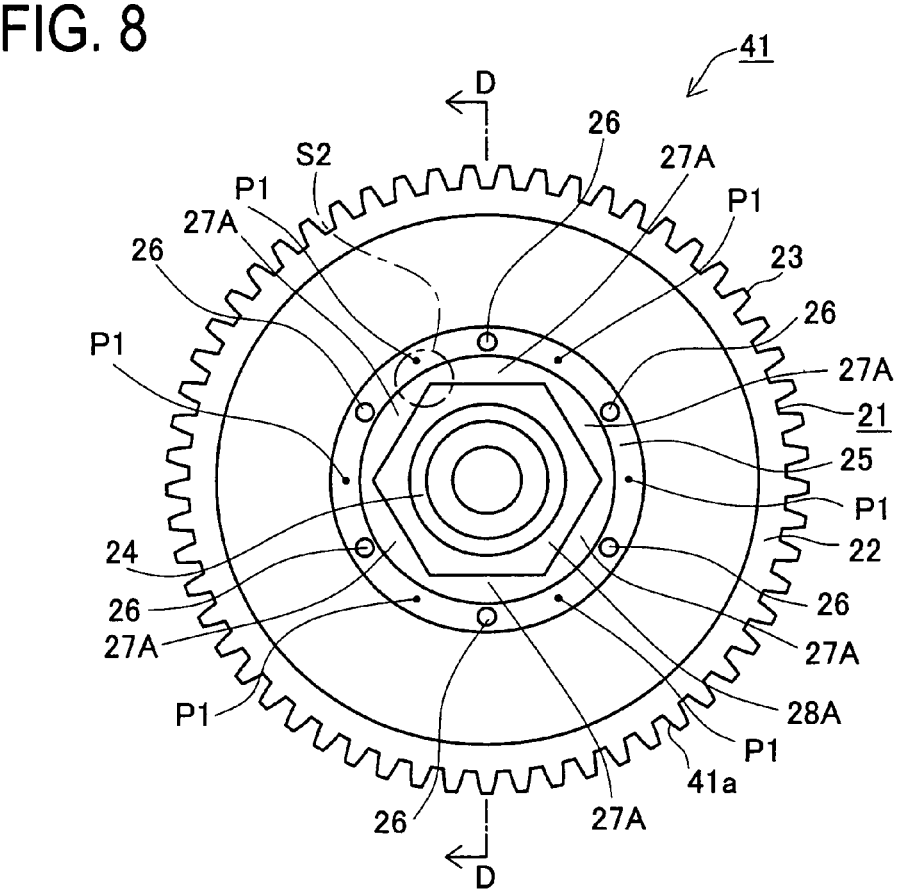
FIG. 8 is a front view of another intermediate gear.
Figure 9:
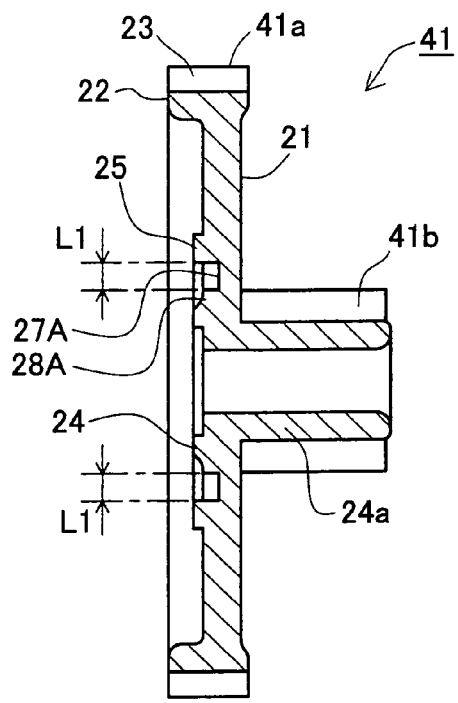
FIG. 9 is a sectional view of the intermediate gear taken along a line D-D in FIG. 8.

FIG. 8 is a front view of an intermediate gear 41 corresponding to a resin gear of the present embodiment. FIG. 9 is a sectional view of the same taken along a line D-D in FIG. 8. The intermediate gear 41 of the present embodiment also includes a large-diameter gear 41a and a small-diameter gear 41b. The intermediate gear 41 of the present embodiment, which does not have the plurality of outer thin-wall portions 29 and the outer thick-wall portion 30 formed between the circular rib 25 and the rim 22 of the intermediate gear 16 of the first embodiment, is provided with only a plurality of inner thin-wall portions 27A and an inner thick-wall portion 28A between the circular rib 25 and the boss 24. In this embodiment, similarly, the length L1 of each inner thin-wall portion 27A in the radius direction (see FIG. 9) is determined to be shorter in the section closer to the midpoint P1 between adjacent two of the gate corresponding points (the gate marks 26). Furthermore, in the present embodiment, each inner thin part 27A is of a shape different from each thin-wall portion 27 of the first embodiment. All the inner thin-wall portions 27A corresponding to the gate corresponding points (the gate marks 26) are equal in shape. Thus, a thick-wall portion 28A taking the outer shape of a hexagon is provided on the plate 21 between the circular rib 25 and the boss 24.

Accordingly, in the present embodiment, the intermediate gear 41 molded of resin can be given the same operations and effects on the central part inside the circular rib 25 as the intermediate gear 16 of the first embodiment. It is therefore possible to enhance accuracy and smoothness of operations of the speed reduction mechanism 6 of the electronically controlled throttle valve system 1. Accordingly, opening/ closing accuracy and the smoothness of operations of the throttle valve 4 can also be enhanced.

The present invention is not limited to the aforementioned embodiments and may be embodied in other specific forms such as the following alternatives without departing from the essential characteristics thereof.

Figure 10:
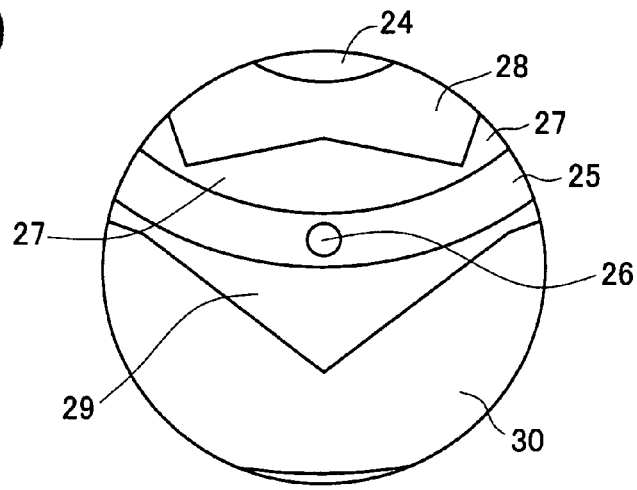
FIG. 10 is an enlarged view of a modification example of a part circled with a chain line in FIG. 3.
Figure 11:
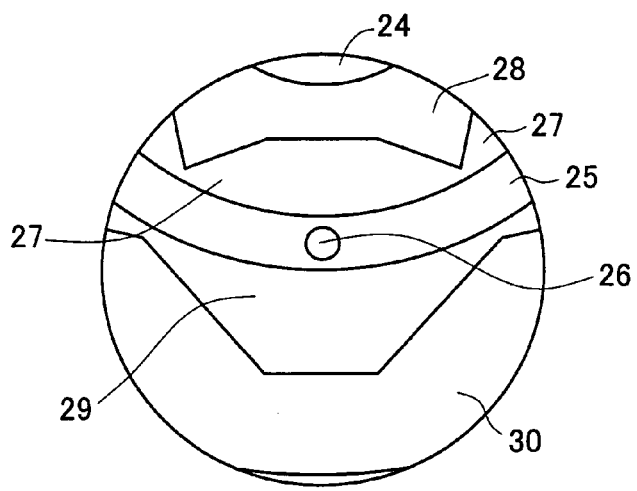
FIG. 11 is an enlarged view of a modification example of the part circled with a chain line in FIG. 3.
Figure 12:
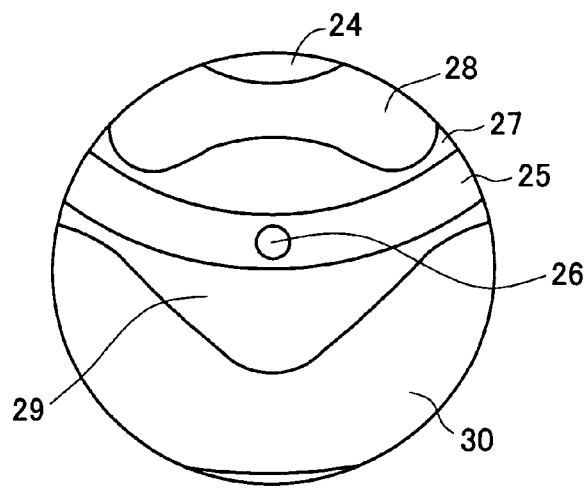
FIG. 12 is an enlarged view of another modification example of the part circled with a chain line in FIG. 3.

In the first embodiment, the outer shapes of the inner thick-wall portion 28 and the outer thick-wall portion 30 are designed with gently curved lines in the area circled with a chain line S1 in FIG. 3. As alternatives, respective outer shapes may be designed with straight lines with sharply-angled corners as shown in FIG. 10, with straight lines with gently-angled corners as shown in FIG. 11, or with sharply-angled spline curves as shown in FIG. 12.

Figure 13:
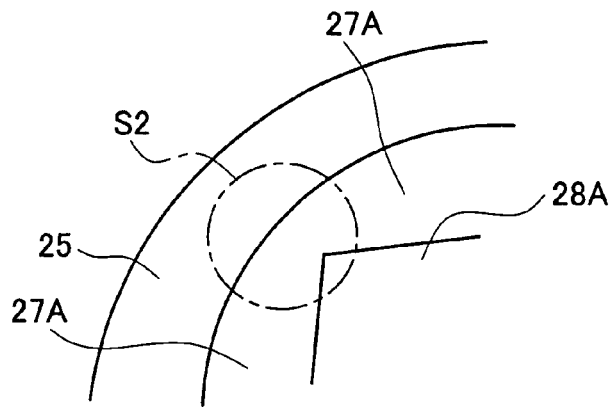
FIG. 13 is a front enlarged view of the part circled with a chain line in FIG. 8.
Figure 14:
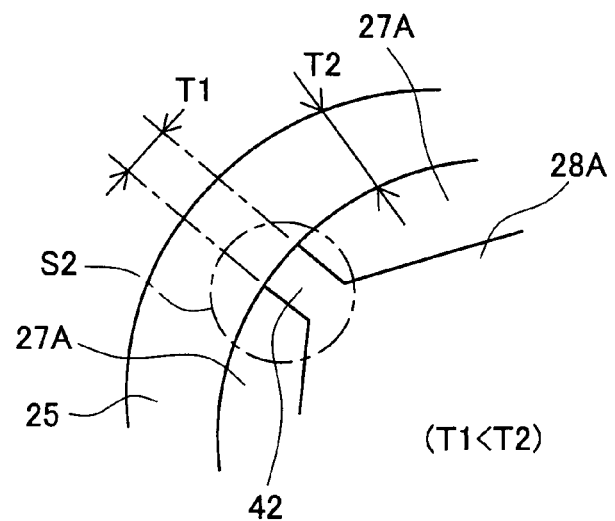
FIG. 14 is an enlarged view of a modification example of the part circled with a chain line in FIG. 8.
Figure 15:
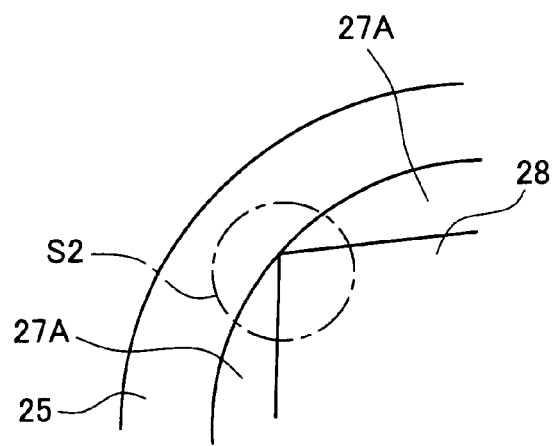
FIG. 15 is an enlarged view of another modification example of part circled with a chain line in FIG. 8.
Figure 16:
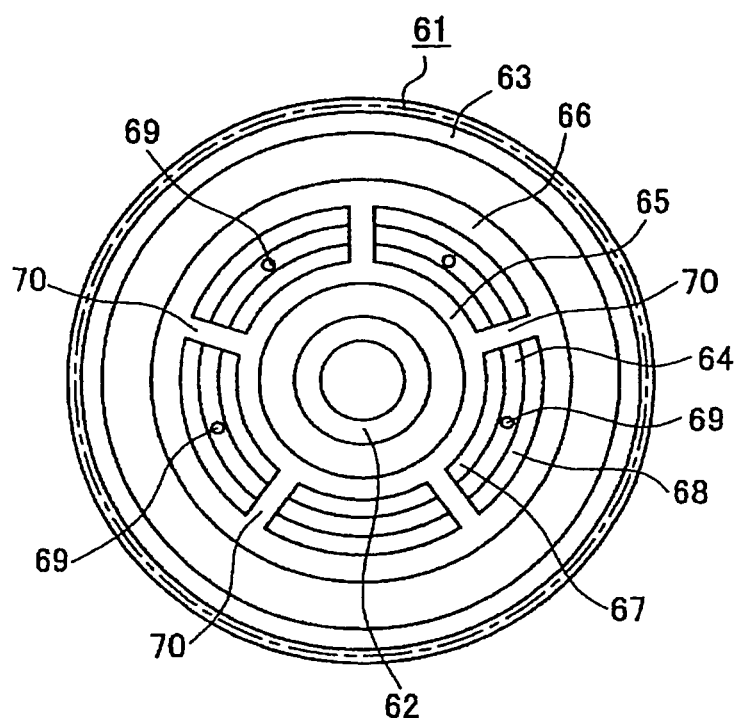
FIG. 16 is a front view of a conventional resin gear.

In the second embodiment, in the area circled with a chain line S2 in FIG. 8, a space is provided between each apex of the polygonal inner thick-wall portion 28A and the circular rib 25 as shown in FIG. 13. Alternatively, a radial rib 42 may be provided in the space between each apex of the polygonal inner thick-wall portion 28A and the circular rib 25 to join them. In this case, the width T1 of the radial rib 42 should preferably be smaller than the width T2 of the circular rib 25. As shown in FIG. 15, alternatively, each apex of the polygonal inner thick-wall portion 28A may be joined with the circular rib 25. Alternatively, the intermediate gear 16 of the first embodiment may also be designed in a similar manner to those in FIGS. 14 and 15.

In the second embodiment, in which the plurality of outer thin-wall portions and the outer thick-wall portion are not provided between the circular rib 25 and the rim 22, the plurality of inner thin-wall portions 27A and the inner thick-wall portion 28A are provided only between the circular rib 25 and the boss 24. Reversely, a plurality of outer thin-wall portions and an outer thick-wall portion may be formed only between the circular rib and the rim without providing the plurality of inner thin-wall portions and the inner thick-wall portion between the circular rib and the boss. The intermediate gear 16 of the first embodiment may also be designed in such a manner.

In the second embodiment, in which the plurality of outer thin-wall portions and the outer thick-wall portion are not provided between the circular rib 25 and the rim 22, the plurality of inner thin-wall portions 27A and the inner thick-wall portion 28A are provided only between the circular rib 25 and the boss 24. The intermediate gear 16 of the first embodiment may also be designed in such a manner.

In each of the above embodiments, the circular rib 25, the inner thin-wall portions 27, the inner thick-wall portion 28, the outer thin-wall portions 29, and the outer thick-wall portion 30 are provided on only the front side of the plate 21. Alternatively, they may be formed on the back side of the plate or on both the front and back sides of the plate.

In each of the above embodiments, the resin gear according to the present invention is embodied as the intermediate gear 16 constituting the speed reduction mechanism 6 of the electronically controlled throttle valve system 1. The resin gear, which is not limited to the intermediate gear 16, may be embodied as a gear for use in any other devices or systems.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method of manufacturing a resin gear, the resin gear comprising:
   a circular plate;
   a rim provided in an outer peripheral part of the plate;
   teeth formed on an outer periphery of the rim;
   a boss provided in a central part of the plate; and
   a circular rib provided on the plate between the boss and the rim and concentrically with the plate;
   the method comprising:
   forming the resin gear as a single component by injecting a molten material through a plurality of gates arranged at equally spaced intervals circumferentially on the circular rib,
   wherein the resin gear is formed with a plurality of inner thin-wall portions which are thinner than the rib in an axial direction on the plate between the circular rib and the boss, each of the plurality of inner thin-wall portions being arranged to correspond with a different gate of the plurality of gates, and being symmetrical with respect to a plurality of radial lines passing through the center of the plate and each of the plurality of gates wherein each inner thin-wall portion is of a length in a radial direction, which is shorter in a section closer to a midpoint between adjacent two of the gates than a section closest to the gate.

2. The method of manufacturing the resin gear according to claim 1, wherein the inner thin-wall portions respectively aligned with the gates are equal in shape so that a thick-wall portion has one of a polygonal outer shape and a petaloid outer shape on the plate between the circular rib and the boss.

3. The method of manufacturing the resin gear according to claim 2, the resin gear further including outer thin-wall portions on the plate between the circular rib and the rim, the outer thin-wall portion being symmetrical with respect to one of the plurality of radial lines passing through the center of the plate and each of the gates.

4. The method of manufacturing the resin gear according to claim 3, wherein each outer thin-wall portion is of a length in the radial direction, which is shorter in a section closer to the midpoint between adjacent two of the gates.

5. The method of manufacturing the resin gear according to claim 4, wherein the outer thin-wall portions respectively aligned with the gates are equal in shape so that the outer thin-wall portions wholly have one of a polygonal outer shape and a petaloid outer shape on the plate between the circular rib and the rim.

6. The method of manufacturing the resin gear according to claim 1, further comprising forming a boss on a back side of the plate including an axially protruding cylindrical portion on an outer periphery of which a small-diameter gear is formed.

7. The method of manufacturing the resin gear according to claim 1, the resin gear further including outer thin-wall portions on the plate between the circular rib and the rim, the outer thin-wall portion being symmetrical with respect to one of the plurality of radial lines passing through the center of the plate and each of the gates.

8. The method of manufacturing the resin gear according to claim 7, wherein each outer thin-wall portion is of a length in the radial direction, which is shorter in a section closer to the midpoint between adjacent two of the gates.

9. The method of manufacturing the resin gear according to claim 8, wherein the outer thin-wall portions respectively aligned with the gates are equal in shape so that the outer thin-wall portions wholly have one of a polygonal outer shape and a petaloid outer shape on the plate between the circular rib and the rim.

10. The method of manufacturing the resin gear according to claim 7, further comprising forming a boss on a back side of the plate including an axially protruding cylindrical portion on an outer periphery of which a small-diameter gear is formed.

11. The method of manufacturing the resin gear according to claim 1, the resin gear further including outer thin-wall portions on the plate between the circular rib and the rim, the outer thin-wall portion being symmetrical with respect to one of the plurality of radial lines passing through the center of the plate and each of the gates.

12. The method of manufacturing the resin gear according to claim 11, wherein each outer thin-wall portion is of a length in the radial direction, which is shorter in a section closer to the midpoint between adjacent two of the gates.

13. The method of manufacturing the resin gear according to claim 12, wherein the outer thin-wall portions respectively aligned with the gates are equal in shape so that the outer thin-wall portions wholly have one of a polygonal outer shape and a petaloid outer shape on the plate between the circular rib and the rim.

14. A method of manufacturing a resin gear, the resin gear comprising:
    a circular plate;
    a rim provided as an outer peripheral part of the plate;
    teeth formed on an outer periphery of the rim;
    a boss provided in a central part of the plate; and
    a circular rib provided on the plate between the boss and the rim and concentrically with the plate;
    the method comprising:
    forming the resin gear as a single component by injecting a molten material through a plurality of gates arranged at equally spaced intervals circumferentially on the circular rib,
    wherein the resin gear is formed with a plurality of outer thin-wall portions which are thinner than the rib in an axial direction on the plate between the circular rib and the rim, each of the outer thin-wall portions being arranged to correspond with a different gate of the plurality of gates, and being symmetrical with respect to a plurality of radial lines passing through the center of the plate and each of the plurality of gates wherein each outer thin-wall portion is of a length in a radial direction, which is shorter in a section closer to a midpoint between adjacent two of the gates than a section closest to the gate.

15. The method of manufacturing the resin gear according to claim 14, wherein the outer thin-wall portions respectively aligned with the gates are equal in shape so that the outer thin-wall portions wholly have one of a polygonal outer shape and a petaloid outer shape on the plate between the circular rib and the rim.

* * * * *